US012658035B2

(12) United States Patent
Jha et al.

(10) Patent No.: US 12,658,035 B2
(45) Date of Patent: Jun. 16, 2026

(54) MULTI-ACCESS EDGE COMPUTING FOR ROADSIDE UNITS

(71) Applicant: George Mason University, Fairfax, VA (US)

(72) Inventors: Santos Jha, Leesburg, VA (US); Duminda Wijesekera, McLean, VA (US); Satish Kolli, Herndon, VA (US); Mahbubul Alam Palash, Fairfax, VA (US)

(73) Assignee: George Mason University, Fairfax, VA (US)

( * ) Notice: Subject to any disclaimer, the term of this patent is extended or adjusted under 35 U.S.C. 154(b) by 543 days.

(21) Appl. No.: 17/537,642

(22) Filed: Nov. 30, 2021

(65) Prior Publication Data

US 2022/0172609 A1    Jun. 2, 2022

Related U.S. Application Data

(60) Provisional application No. 63/150,833, filed on Feb. 18, 2021, provisional application No. 63/119,542, filed on Nov. 30, 2020.

(51) Int. Cl.
*G08G 1/01* (2006.01)
*G08G 1/017* (2006.01)
(Continued)

(52) U.S. Cl.
CPC ......... *G08G 1/0145* (2013.01); *G08G 1/0125* (2013.01); *G08G 1/017* (2013.01); *G08G 1/127* (2013.01); *H04W 4/40* (2018.02)

(58) Field of Classification Search
CPC .... G08G 1/0145; G08G 1/0125; G08G 1/017; G08G 1/127; H04W 4/40
See application file for complete search history.

(56) References Cited

U.S. PATENT DOCUMENTS

| 8,700,299 B2 * | 4/2014 | Morita | ............ | G08G 1/096716 |
| | | | | 701/123 |
| 10,365,115 B2 * | 7/2019 | Nair | ..................... | G08G 1/0145 |

(Continued)

*Primary Examiner* — Hussein Elchanti
(74) *Attorney, Agent, or Firm* — Leveque Intellectual Property Law, P.C.

(57) ABSTRACT

A wireless multi-edge computing (MEC)-based road-side unit (RSU) (RSU-MEC) system and method for traffic management. The traffic management system includes: a first fifth-generation cellular (5G) roadside unit (RSU), the first RSU operable to couple to a first mobile user element (UE) via a first wireless link; a second 5G RSU, the second RSU operable to couple to a second mobile UE via a second wireless link; a first multi-access edge computing (MEC) host of the first 5G RSU, operable to provide one or more of compute resources, storage resources, and network resources by executing at least a first application to manage vehicle traffic flow in a first cellular zone; and a second MEC host of the second RSU, operable to provide one or more of compute resources, storage resources, and network resources by executing at least a second application to manage vehicle traffic flow in a second cellular zone, the second application being coupled to the first application via an application programming interface (API) in a manner that facilitates management of vehicle traffic flow in a combined cellular zone by the first application and the second application.

25 Claims, 14 Drawing Sheets

(51) Int. Cl.
    *G08G 1/127*     (2006.01)
    *H04W 4/40*     (2018.01)

(56) References Cited

U.S. PATENT DOCUMENTS

| | | | | |
|---|---|---|---|---|
| 11,069,234 B1 * | 7/2021 | Mulligan | G08G 1/087 |
| 11,237,554 B2 * | 2/2022 | Rezaeian | G06F 3/013 |
| 2005/0104745 A1 * | 5/2005 | Bachelder | G08G 1/01 |
| | | | 340/988 |
| 2005/0187701 A1 * | 8/2005 | Baney | G08G 1/096716 |
| | | | 340/907 |
| 2009/0167561 A1 * | 7/2009 | Liang | G08G 1/095 |
| | | | 340/907 |
| 2009/0287401 A1 * | 11/2009 | Levine | G08G 1/096805 |
| | | | 701/117 |
| 2010/0030458 A1 * | 2/2010 | Coughlin | B60W 40/09 |
| | | | 701/123 |
| 2010/0082190 A1 * | 4/2010 | Jinno | B60K 6/52 |
| | | | 903/918 |
| 2010/0171640 A1 * | 7/2010 | Delia | G08G 1/07 |
| | | | 340/907 |
| 2010/0308986 A1 * | 12/2010 | Dobryden | G08C 17/02 |
| | | | 340/439 |
| 2011/0043348 A1 * | 2/2011 | Blackard | F16H 63/42 |
| | | | 340/439 |
| 2011/0126797 A1 * | 6/2011 | Russell | F02D 19/0692 |
| | | | 123/294 |
| 2014/0336913 A1 * | 11/2014 | Fino | G08G 1/096844 |
| | | | 701/465 |
| 2015/0145995 A1 * | 5/2015 | Shahraray | H04W 4/70 |
| | | | 348/148 |
| 2015/0154860 A1 * | 6/2015 | Holzwanger | G08G 1/005 |
| | | | 340/944 |
| 2016/0148507 A1 * | 5/2016 | Pittman | G06Q 30/0255 |
| | | | 340/917 |
| 2016/0358463 A1 * | 12/2016 | Cho | G08G 1/0145 |
| 2017/0124868 A1 * | 5/2017 | Bhat | G08G 1/09623 |
| 2017/0154525 A1 * | 6/2017 | Zou | G08G 1/095 |
| 2018/0075739 A1 * | 3/2018 | Ginsberg | B60K 35/00 |
| 2018/0151064 A1 * | 5/2018 | Xu | G08G 1/0125 |
| 2018/0157258 A1 * | 6/2018 | O'Brien | G05D 1/0088 |
| 2018/0253968 A1 * | 9/2018 | Yalla | G08G 1/097 |
| 2018/0261083 A1 * | 9/2018 | Sun | G08G 1/012 |
| 2018/0286228 A1 * | 10/2018 | Xu | G08G 1/0145 |
| 2019/0082377 A1 * | 3/2019 | Silver | G08G 1/161 |
| 2019/0086219 A1 * | 3/2019 | Hashisho | G05D 1/0223 |
| 2019/0122178 A1 * | 4/2019 | Kempf | G06Q 10/063114 |
| 2019/0122548 A1 * | 4/2019 | Sakuma | G08G 1/08 |
| 2019/0180617 A1 * | 6/2019 | Hori | B60W 50/0097 |
| 2019/0228593 A1 * | 7/2019 | Liu | G08G 1/096872 |
| 2019/0272747 A1 * | 9/2019 | Raamot | G08G 1/0129 |
| 2020/0107172 A1 * | 4/2020 | Bharadwaj | H04W 72/0446 |
| 2020/0184238 A1 * | 6/2020 | Kobayashi | G06V 40/161 |
| 2020/0327343 A1 * | 10/2020 | Lund | H04W 4/46 |
| 2021/0058396 A1 * | 2/2021 | Nathanson | H04W 12/08 |
| 2022/0327927 A1 * | 10/2022 | Yilma | G08G 1/0133 |
| 2022/0353732 A1 * | 11/2022 | Filippou | H04W 28/0289 |

* cited by examiner

100

300

400

410

ZONE 2

UE₄₇

UE₄₅

420B　UE₄₄

UE₄₆

ZONE 1

UE₄₁

UE₄₂

UE₄₃

420A

| Credential Management | | |
|---|---|---|
| Expiration Management | Storage Management | Access Management |
| Storage (PKCS12) | | |

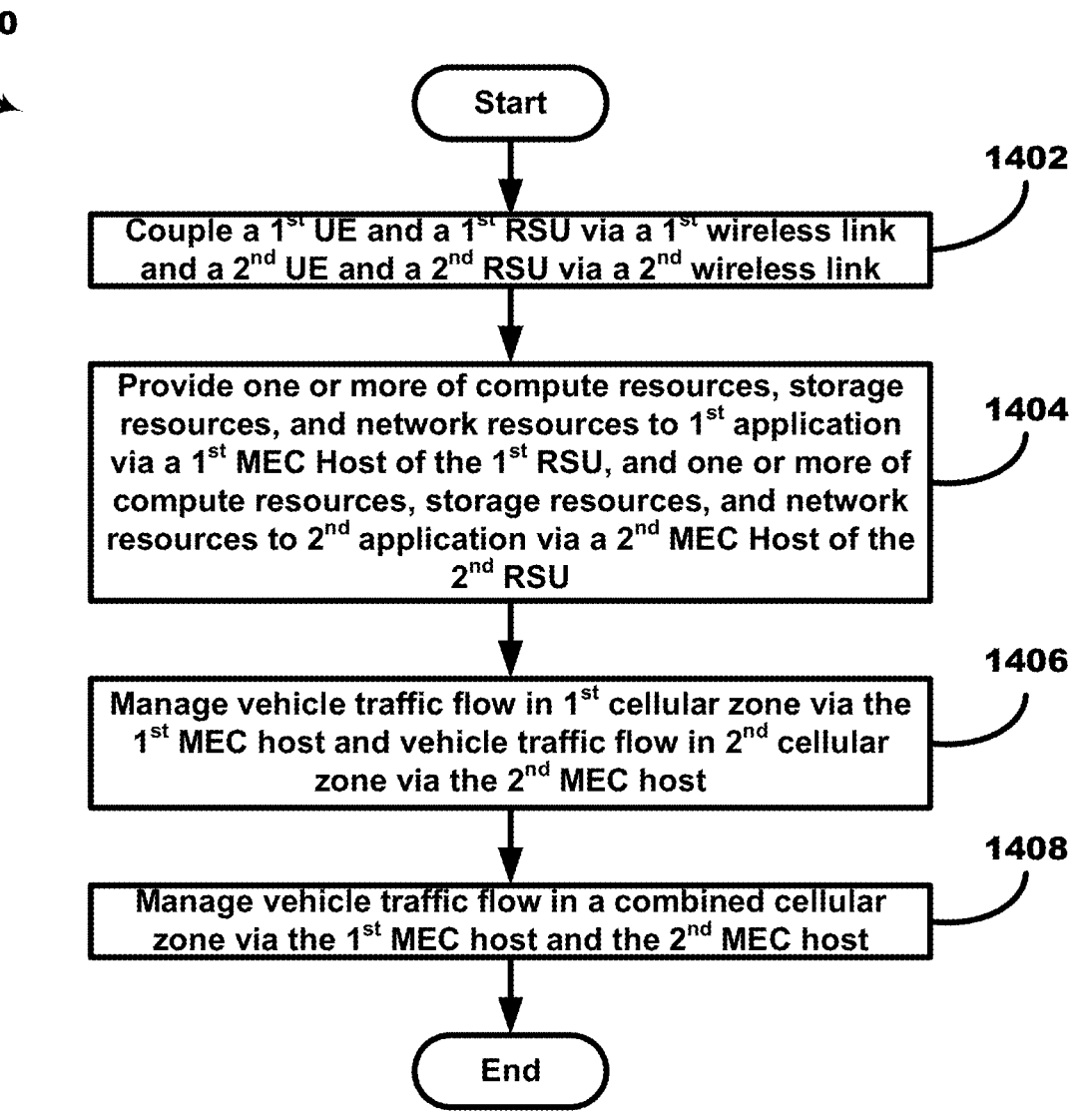

Start

1402

Couple a 1st UE and a 1st RSU via a 1st wireless link and a 2nd UE and a 2nd RSU via a 2nd wireless link

1404

Provide one or more of compute resources, storage resources, and network resources to 1st application via a 1st MEC Host of the 1st RSU, and one or more of compute resources, storage resources, and network resources to 2nd application via a 2nd MEC Host of the 2nd RSU

1406

Manage vehicle traffic flow in 1st cellular zone via the 1st MEC host and vehicle traffic flow in 2nd cellular zone via the 2nd MEC host

1408

Manage vehicle traffic flow in a combined cellular zone via the 1st MEC host and the 2nd MEC host End

FIG. 14

MULTI-ACCESS EDGE COMPUTING FOR ROADSIDE UNITS

CROSS-REFERENCE TO RELATED APPLICATIONS

This application claims the benefit of U.S. Provisional Patent Application Ser. Nos. 63/119,542 (filed on Nov. 30, 2020) and 63/150,833 (filed on Feb. 18, 2021), which are each hereby incorporated by reference in their respective complete entireties.

TECHNICAL FIELD

One or more embodiments set forth, disclosed, and/or illustrated herein relate to a wireless multi-edge computing (MEC)-based road-side unit (RSU) (RSU-MEC) system and method for traffic management.

BACKGROUND

Two or more roads that go in different directions meet at intersections and converge, or diverge. These roads can be at the same plane, or at two or more levels where one traverses over the other. In situations where the roads are at the same level or plane, the purpose of having an intersection controller is to ensure that a common roadway between the meeting road segments are used in a mutually exclusive manner at any given moment of time. Controlling the traffic through same level intersections, referred to as intersection control, serves to minimize and modify conflicting points, harmonizes speeds, enhances mutual visibility, and provides space and protection for pedestrians and bicyclists.

Edge computing addresses a paradigm shift from cloud to edge computing by aiming to offer a different service environment, including cloud-computing capabilities, within the road infrastructure by placing the access network infrastructure in close proximity to vehicles and Road-Side Units (RSU) (e.g., vehicle-to-infrastructure (V2I) interfaces). The European Telecommunications Standards Institute (ETSI) has developed MEC architecture having a security mechanism that is augmented in accordance with an embodiment of the present disclosure.

The original definition of RSU was established by the Federal Communications Commission (FCC) as part of the allocation of the 5.9 GHz band for Intelligent Transportation System (ITS), which is defined as a radio (DSRC or CV2X) transceiver that is mounted along a road or pedestrian passageway, including cycle lanes. An RSU may also be mounted on a vehicle or may be carried manually, but may operate only when stationary. Furthermore, operation of an RSU is restricted to a location where it is licensed to operate. Portable or hand-held RSUs, however, are permitted to operate where they do not interfere with a site-licensed operation.

An RSU can transmit data to on-board units (OBUs) or exchange data with OBUs within its communications range and frequency bands. An RSU also provides channel assignments inside the base frequency bands and when require operating instructions to OBUs in its communications zone. An RSU performs two core functions in a connected vehicle system. Firstly, provide IPv6 access to remote network hosts: the RSU provides DSRC-equipped mobile devices with access to Back Office services by way of IPv6. This allows devices to take advantage of services such as the United States Department of Transportation (USDOT) Situation Data Clearinghouse, Situation Data Warehouse, and Security Credential Management System (SCMS) as well as other public and private network services. Secondly, an RSU transmits and receive messages as defined in Society of Automotive Engineers (SAE) Standard J2735. In the case of the Situation Data Clearinghouse and Situation Data Warehouse, data related to vehicle trace conditions (speed, traffic volume, etc.) are sent from a vehicle over DSRC or CV2X through an RSU to the Situation Data Clearinghouse and Situation Data Warehouse utilizing the RSUs backhaul connection. The RSU also receives messages transmitted by a DSRC or CV2X equipped mobile device and forwards them to a remote host. Messages are forwarded based on the Provider Service Identifier (PSID).

Currently, the National Transportation Communications for Intelligent Transportation Systems (ITS) Protocol (NTCIP) Standard 1218 is under development, and only specifies the logical interface between an RSU and the controlling management stations, and defines the information that may be exchanged between them.

In vehicle-to-everything (V2X) applications, an RSU serves as an interface between connected devices, including vehicles and the roadway infrastructure, and provides an excellent entity to be in charge of electronically controlling vehicle movements through the intersections. In principle, an RSU broadcasts data to On-Board Units (OBUs) within its communications zone, exchanges data with other RSUs, and collects information that are transmitted by OBUs. RSUs are designed to exchange MAP and SPaT messages, and collect BSM messages. MAP messages convey road geometry, and an Intersection Map messages convey the geometry of the intersection, and Signal Phase and Timing (SPaT) carries the current signal state, and time until change. Basic Safety Message (BSM) are constructed to exchange safety data regarding vehicle state. Moving vehicles are expected to use static MAP, and dynamic SPaT in their navigational decision-making process.

An RSU may serve as a communications platform to send messages to, and receive messages from, nearby vehicles using Dedicated Short-Range Communications (DSRC), Cellular Vehicle-to-Everything (CV2X), or other wireless communications platforms. Communications with adjacent field equipment and back-office centers that monitor and control the RSU also need to be supported as a part of the RSU. An RSU may be a permanent device operating from a fixed position or a portable device that is located temporarily in the vicinity of, e.g., a traffic incident, road construction or a special event. An RSU generally includes a processor, data storage, and communications capabilities that support secure communications with passing vehicles, other field equipment, and centers.

With the appearance of 5G and its capabilities, many standards that were aligned with DSRC begin a transition to 5G. An example is the migration of road vehicular messages from DSRC based 802.11p to cellular infrastructure. This introduced several changes in the physical and MAC layers of the network, but brings minimal changes to upper messaging layers that directly matter to vehicular navigation. This further consolidated by the fact that the new SAE standard for C-V2X SAE-J3161 will be compliant with SAE J2735 and SAE J2945.

C-V2X defines an RSU, not as an architectural entity, but rather as an implementation option. This is achieved by collocating a V2X application logic/server with some entities of the 3GPP system.

MEC offers application developers and content providers with cloud-computing capabilities and an IT service environment at the edge of the telecommunication network and is characterized by ultra-low latency, high bandwidth, and the fastest possible access to the radio network of the telecommunication provider. This expansion from Cloud to Edge Computing for connected services is driven by both the need to have more processing power closer to the vehicles to guarantee the required latency and the need to have reduced network churn with continuous access to the Cloud.

SUMMARY

In accordance with one or more embodiments, a wireless RSU-MEC system and method are provided for traffic management, and which demonstrate the feasibility of migrating the functionality of physical signal light controllers from static locations near intersections, to 5G MEC-based radio signals without losing functionality and possibly adding more.

Currently, there is no way a vehicle can query historical data and current traffic statistics from an RSU. In accordance with one or more embodiments of the present disclosure, the NTCIP protocol is extended: (i) to define the secure transmission of lane-centric, 3-dimensional road information, traffic statistics, weather conditions, GNSS coordinates, and (ii) to facilitate an RSU to communicate such information with the management center for such purposes.

In accordance with one or more embodiments, a traffic management system may comprise one or more of the following: a first fifth-generation cellular (5G) roadside unit (RSU), the first RSU operable to couple to a first mobile user element (UE) via a first wireless link; a second 5G RSU, the second RSU operable to couple to a second mobile UE via a second wireless link; a first multi-access edge computing (MEC) host of the first 5G RSU, operable to provide one or more of compute resources, storage resources, and network resources by executing at least a first application to manage vehicle traffic flow in a first cellular zone; a second MEC host of the second RSU, operable to provide one or more of compute resources, storage resources, and network resources by executing at least a second application to manage vehicle traffic flow in a second cellular zone, the second application being coupled to the first application via an application programming interface (API) in a manner that facilitates management of vehicle traffic flow in a combined cellular zone by the first application and the second application.

In accordance with one or more embodiments, a computer-implemented method for traffic management may comprise one or more of the following: coupling, via a first wireless link, a first UE and a first RSU, and coupling, via a second wireless link, a second UE and a second RSU; providing, via a first MEC host of the first RSU, one or more of compute resources, storage resources, and network resources to a first application for execution by the first MEC host, and concurrently providing, via a second MEC host of the second RSU, one or more of compute resources, storage resources, and network resources to a second application for execution by the second MEC host; managing, via the first MEC host, vehicle traffic flow in a first cellular zone or region, and concurrently managing, via the second MEC host, vehicle traffic flow in a second cellular zone or region; and managing, by execution of the first application by the first MEC host and the second application by the second MEC host, vehicle traffic flow in a combined and/or overlapping cellular zone, wherein, via an API, the first MEC host and the second MEC host are coupled via an API.

In accordance with one or more embodiments, a traffic management system may comprise one or more of the following: a 5G RSU, operable to couple to a mobile UE via a gNode B (gNB) logical radio node and at least a first wireless link; and an MEC host of the 5G RSU, operable to provide at least one of compute, storage, and network resources for an application managing vehicle traffic flow in an intersection independent of a traffic signal.

In accordance with one or more embodiments, at least one API call between the first application and the second application is authenticated based, at least in part, on a Security Credential Management System (SCMS) enrollment certificate.

In accordance with one or more embodiments, one or more of the first wireless link and the second wireless link comprises a 5G cellular-vehicle-to-everything (CV2X) link.

In accordance with one or more embodiments, the first wireless link comprises messages in a 5G Basic Safety Message (BSM) format, and the second wireless link comprises messages in the 5G BSM format.

In accordance with one or more embodiments, one or more of the first mobile UE and the second mobile UE is operable to report traffic events to the first MEC host and the second MEC host, respectively, the first MEC host is operable to respond to the report from the first mobile UE in accordance with a received policy, and the second MEC host is operable to respond to the report from the second mobile UE in accordance with a received policy.

In accordance with one or more embodiments, one or more sensor UEs are operably coupled to the RSU via at least a third wireless link, and a changeable message display UE is operably coupled to the RSU via at least the third wireless link.

In accordance with one or more embodiments, the at least a third wireless link comprises a 5G cellular-vehicle-to-everything (CV2X) link.

In accordance with one or more embodiments, managing vehicle traffic flow in the first cellular zone comprises managing one or more traffic intersections and one or more traffic lanes, and managing vehicle traffic flow in the second cellular zone comprises managing one or more traffic intersections and one or more traffic lanes.

In accordance with one or more embodiments, managing vehicle traffic flow in the first cellular zone comprises managing one or more traffic intersections independently of a corresponding traffic signal, and managing vehicle traffic flow in the second cellular zone comprises managing one or more traffic intersections independently of a corresponding traffic signal.

In accordance with one or more embodiments, one or more of the first mobile UE and the second mobile UE is operably coupled to an emergency vehicle and operable to transmit a destination to at least one of the first MEC host and the second MEC host, and in response to receipt of the destination, at least one of the first MEC host and the second MEC host is operable to reply with a path to the destination, and then reserve a traffic lane on at least a portion of the path for use by the emergency vehicle.

DRAWINGS

The various advantages of the embodiments of the present disclosure will become apparent to one skilled in the art by reading the following specification and appended claims, and by referencing the following drawings, in which:

FIG. 12 illustrates credential management for the wireless traffic management system, in accordance with one or more embodiments set forth, shown, and/or described herein.

FIG. 14 illustrates a flow chart of a computer-implemented method for traffic management, in accordance with one or more embodiments set forth, shown, and/or described herein.

DETAILED DESCRIPTION

Design of a wireless RSU-MEC system for C-V2X includes details about the cloud platform for this edge computing infrastructure, authentication, authorization, credential management, and inter-MEC communication.

An RSU works at the very local level and interacts with OBUs using radios. As designed, an RSU cannot actively engage with traffic management centers as protocols and interfaces undefined. The current specifications are also bound to the DSRC protocol, and consequently the DSRC capabilities, including the transmission range, constrain its capability. Moreover, a more capable RSU that interacts with a plurality of different types and overall number of devices will require more resources, such as, for example, processing, storage, and networking. In time, as the overall number of devices and services increase, the demand for resources will also increase. Public cloud facilities cannot fulfill these demands as latency might be a prohibiting factor, as it may involve long response times.

Adoption of the 5G standard may address the issues discussed herein, as the current 5G architecture facilitates the use of MEC systems. MEC architectures move computation and services to the edge of the network by directly interfacing with Radio Access Networks (RAN). MEC analyzes, processes, and stores the data at the network edge, thereby reducing the latency and brings real-time performance to high-bandwidth applications. In order to support such capabilities, MEC uses unique features of the 5G design. MEC depends upon a virtualization platform for running applications at the mobile network edge. Network Functions Virtualization (NFV) provides a virtualization platform to network functions that facilitates the creation of a plurality of virtual networks on top of a shared physical infrastructure for different kinds of applications, called network slicing. MEC applications are state-independent, do not need to keep state information related to the User Elements (UEs) they serve, and are deployed as a radio node aggregation point that directly interfaces the core of the 5G Network. MEC application programming interfaces (APIs) are based on representational state transfer (REST) APIs that are mostly location independent.

Figure 1:
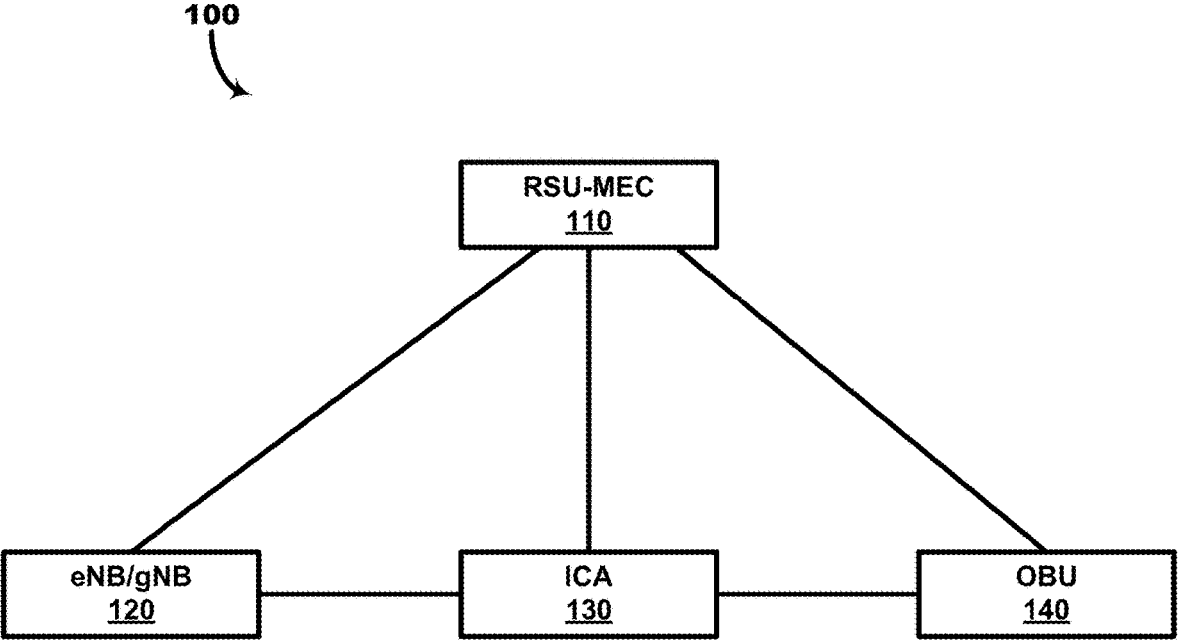
FIG. 1 illustrates a block diagram of a wireless traffic management system, in accordance with one or more embodiments set forth, shown, and/or described herein.

As illustrated in FIG. 1, in accordance with one or more embodiments of the present disclosure, an RSU-MEC system 100 is provided, and includes one or more RSU-MECs 110 operatively connected to one or more network nodes 120 (e.g., Enhanced Based Stations/Next Generation ENodeB (eNB/gNB)), an Implicit Certificate Authority (ICA) 130, and one or more OBUs 140. The eNB/gNB 120 comprises one or more base stations configured to provide new radio (NR) access user plane and control plane protocol terminations points at a user equipment (UE) and connected to the Next Generation (NG) interface to an 5G Core (5GC) network. Similarly, the one or more MECs 120 are configured to execute software applications on a virtualized infrastructure, which is in or adjacent to the edge of the 5GC network. As used herein, UE is any device operatively connected to a mobile network.

Each eNB/gNB 120, in its most basic form, is operatively connected to the 5GC network using Next Generation (NG) reference points, and consumes messages coming from UE mounted on, or coupled to, vehicles and several types of sensors. The wireless RSU-MEC system 100 receives messages from one or more UE via the eNB/gNB 120. In accordance with one or more embodiments, the wireless RSU-MEC system 100 is also configured to generate messages for, and consumes messages from, different sensors operatively connected to the UE(s) and uses them for various purposes, including but not limited to traffic management, emergency vehicle management, etc.

In accordance with one or more embodiments, the RSU-MEC system 100 unifies intersection management, since basic safety messages (BSM) sent from UEs (e.g., connected vehicles) on the 5GC network, plus traffic data collected from road sensors such as, for example, CCTV cameras, microwave sensors, etc., are processed by a single server at the edge of the 5GC network that has the low latency and high bandwidth performance of the one or more RSU-MECs 110. The BSMs are configured to exchange safety data regarding vehicle state. The BSMs are frequently broadcast to surrounding vehicles to make them aware of a status of a broadcasting vehicle. BSM has a mandatory core part (i.e., Part I) and an optional (i.e., Part II content) and regional extensions. Generally, BSMs, however, do not have lane-level detail. In accordance with one or more embodiments, the RSU-MEC system 100 enhances the overall capability of BSMs by adding traffic lane information because vehicles occupy and travel inside traffic lanes. The traffic lane level details enable RSUs to estimate the number of vehicles queued on each traffic lane, and enhance the ability to estimate the signal phase timing in actuated signals by an IMS.

Figure 2:
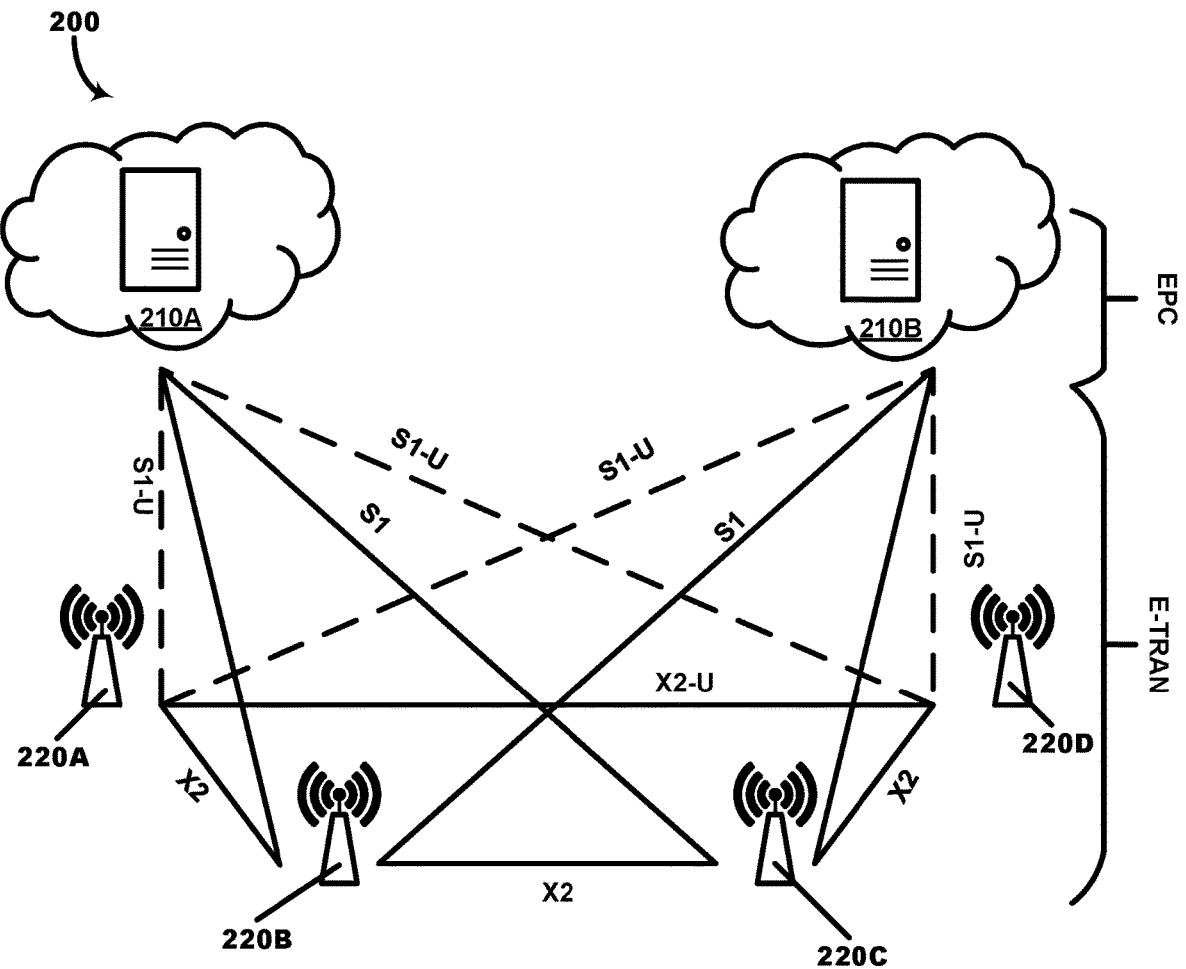
FIG. 2 illustrates 5G network infrastructure for the wireless RSU-MEC system, in accordance with one or more embodiments set forth, shown, and/or described herein.

As illustrated in FIG. 2, in accordance with one or more embodiments, a wireless RSU-MEC system 200 may include a pair of RSU-MECs 210A, 210B operatively connected to one or more eNB/gNB 220A, 220B, 220C, and 220D arranged in an array.

Figure 3:
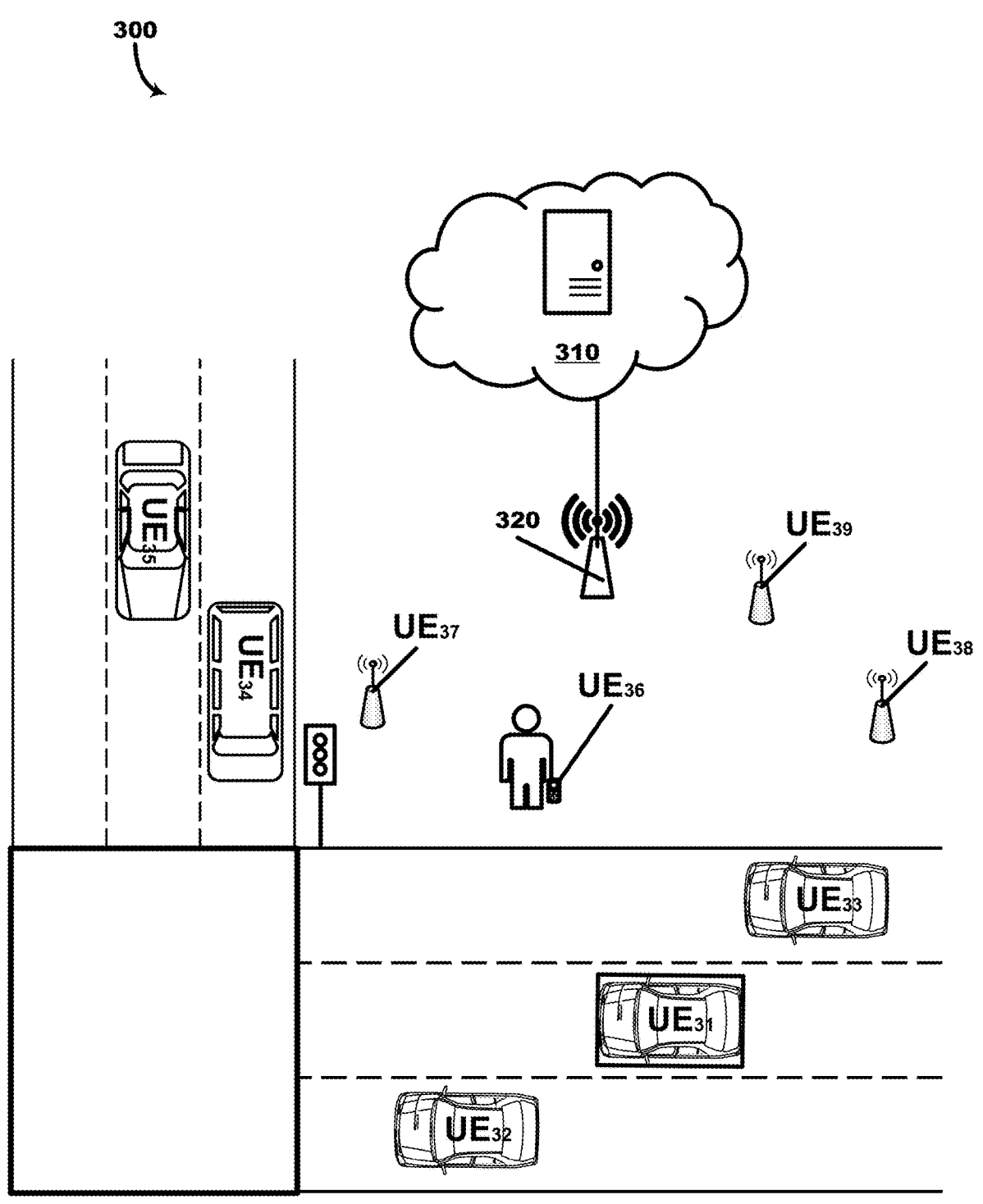
FIG. 3 illustrates deployment of a wireless traffic management system, in accordance with one or more embodiments set forth, shown, and/or described herein.

As illustrated in FIG. 3, in accordance with one or more embodiments, a traffic management implementation of a wireless RSU-MEC system 300 comprises an RSU-MEC 310 operatively connected to a network node 320. In accordance with one or more embodiments, the network node 320 comprises an eNB/gNB. Embodiments, however, are not limited thereto, and thus, this disclosure contemplates the network node 320 comprising any radio network node that falls within the spirit and scope of the principles of this disclosure.

The wireless RSU-MEC system 300 is configured for operative connection to one or more UEs. The UEs may comprise non-stationary UEs such as, for example, connected vehicles $UE_{31}$, $UE_{32}$, $UE_{33}$, $UE_{34}$, and $UE_{35}$. The UEs may also comprise one or more portable mobile devices $UE_{36}$, one or more sensors (e.g., road sensors) $UE_{37}$ and $UE_{38}$, and one or more changeable traffic displays $UE_{39}$.

In accordance with one or more embodiments, one or more of the connected vehicles $UE_{31}$, $UE_{32}$, $UE_{33}$, $UE_{34}$, and $UE_{35}$ may comprise an autonomous vehicle. As described herein, an "autonomous vehicle" may comprise a vehicle that is configured to operate in an autonomous mode. As set forth, described, and/or illustrated herein, "autonomous mode" means that one or more computing systems are used to operate, and/or navigate, and/or maneuver the vehicle along a travel route with minimal or no input from a human driver.

In accordance with one or more embodiments, the connected vehicles $UE_{31}$, $UE_{32}$, $UE_{33}$, $UE_{34}$, and $UE_{35}$ may comprise an automobile. Embodiments, however, are not limited thereto, and thus, this disclosure contemplates the connected vehicle comprising a connected train, a connected bus, a connected bus, connected emergency vehicle, or any other form of vehicle that falls within the spirit and scope of the principles of this disclosure. In accordance with one or more embodiments, traffic intersections are managed independent of traffic signals, and traffic lanes managed independent of each other, by communicating with the connected vehicles $UE_{31}$, $UE_{32}$, $UE_{33}$, $UE_{34}$, and $UE_{35}$ via the wireless RSU-MEC system 300, which achieves a significant cost savings.

In accordance with one or more embodiments, connected vehicles comprising emergency vehicles may transmit a desired destination to the one or more RSU-MEC 310, which is configured to determine the fastest navigation route and/or make a reserved traffic lane for the emergency vehicle using the determined fastest navigation route to reach the desired destination.

In accordance with one or more embodiments, the connected vehicles $UE_{31}$, $UE_{32}$, $UE_{33}$, $UE_{34}$, and $UE_{35}$, portable mobile device $UE_{36}$, sensors $UE_{37}$ and $UE_{38}$, and changeable traffic displays $UE_{39}$ may emit basic safety messages and also report traffic events to the wireless RSU-MEC system 300 for processing in accordance with policies received by the RSU-MEC 310.

Figure 4:
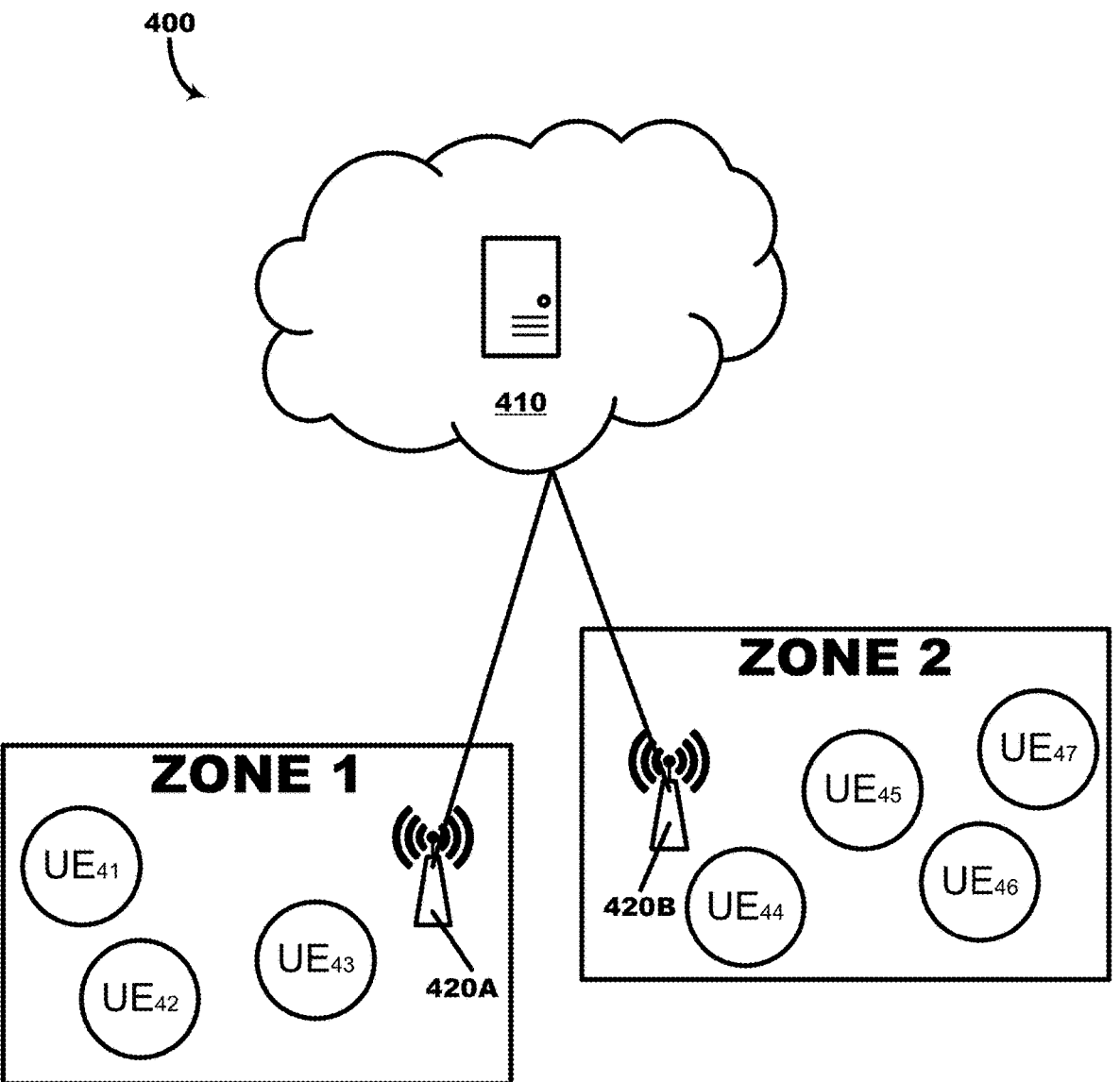
FIG. 4 illustrates a wireless traffic management system deployed in a plurality of cellular zones, in accordance with one or more embodiments set forth, shown, and/or described herein.

As illustrated in FIG. 4, in accordance with one or more embodiments, a traffic management implementation of a wireless RSU-MEC system 400 is provided that interacts with a plurality of cellular zones independently managed by one or more eNB/gNBs. In the illustrated example, an RSU-MEC 410 is operatively connected to a first eNB/gNB 420A that independently manages one or more UEs, such as $UE_{41}$, $UE_{42}$, and $UE_{43}$ in a first cellular zone or region, and is also operatively connected to a second eNB/gNB 420B that independently manages one or more UEs, such as $UE_{44}$, $UE_{45}$, $UE_{46}$, and $UE_{47}$ in a second cellular zone or region. In accordance with one or more embodiments, $UE_{41}$, $UE_{42}$, and $UE_{43}$ may comprise non-stationary UEs such as, for example, connected vehicles, portable mobile devices, changeable traffic displays, road sensors, and combinations thereof.

Figure 5:
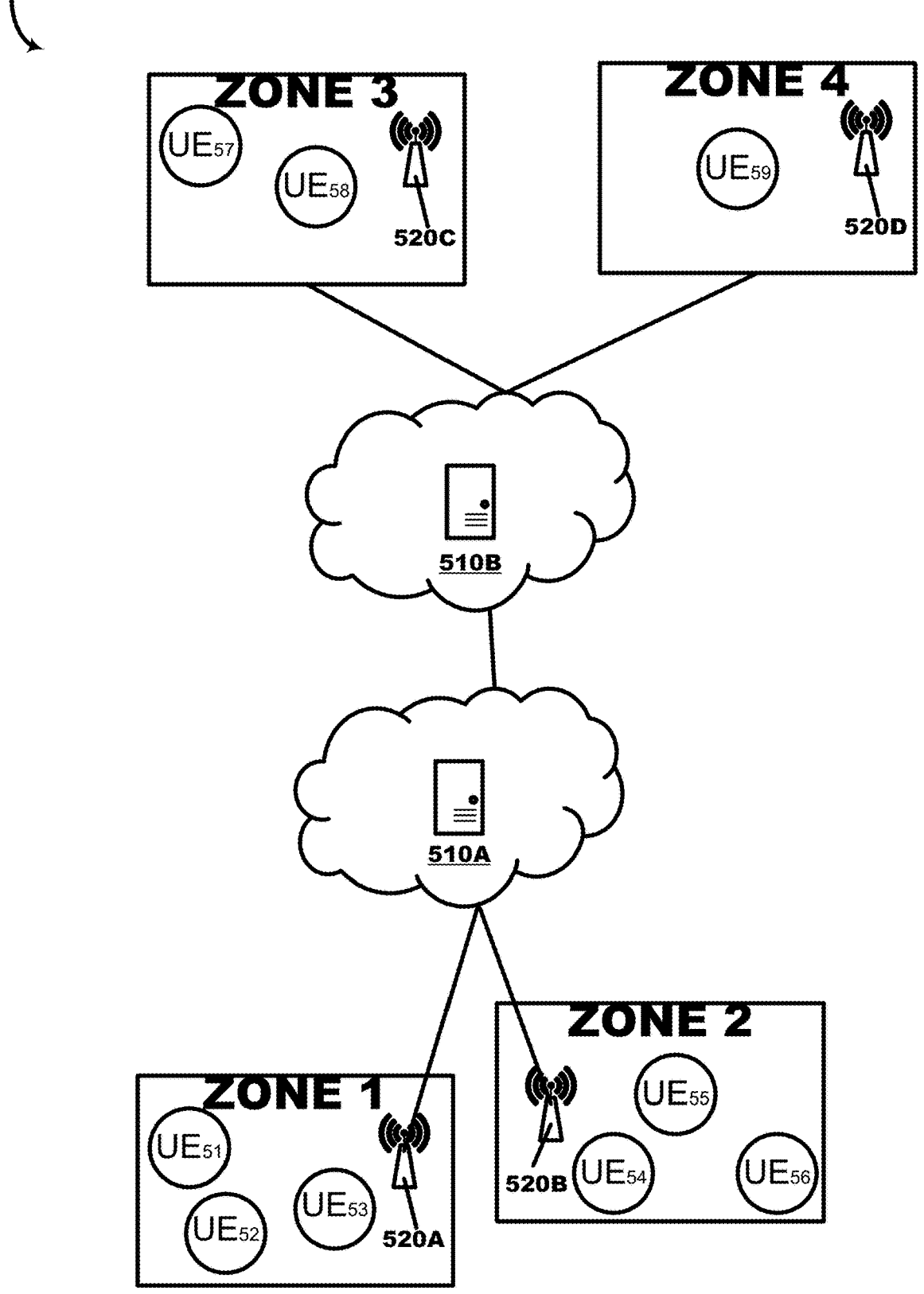
FIG. 5 illustrates a wireless traffic management system having a pair of linked MECs deployed in a plurality of cellular zones, in accordance with one or more embodiments set forth, shown, and/or described herein.

As illustrated in FIG. 5, in accordance with one or more embodiments, a traffic management implementation of a wireless RSU-MEC system 500 in which a plurality of RSU-MEC are operatively connected to manage traffic over a plurality of zones that geographically cover large cellular zones or regions. In the illustrated example, a first RSU-MEC 510A and a second RSU-MEC 510B are operatively connected to manage traffic over four zones. For instance, the first RSU-MEC 510A is operatively connected to a first eNB/gNB 520A that independently manages $UE_{51}$, $UE_{52}$, and $UE_{53}$ in a first cellular zone or region, and is also operatively connected to a second eNB/gNB 520B that independently manages $UE_{54}$, $UE_{55}$, and $UE_{56}$ in a second cellular zone or region. The second RSU-MEC 510B is operatively connected to a third eNB/gNB 520C that independently manages $UE_{57}$ and $UE_{58}$ in a third cellular zone or region, and is also operatively connected to a fourth eNB/gNB 520D that independently manages $UE_{59}$ in a fourth cellular zone or region. In accordance with one or more embodiments, the plurality of RSU-MEC may work independently from each other, or work in combination with each other.

Figure 6:
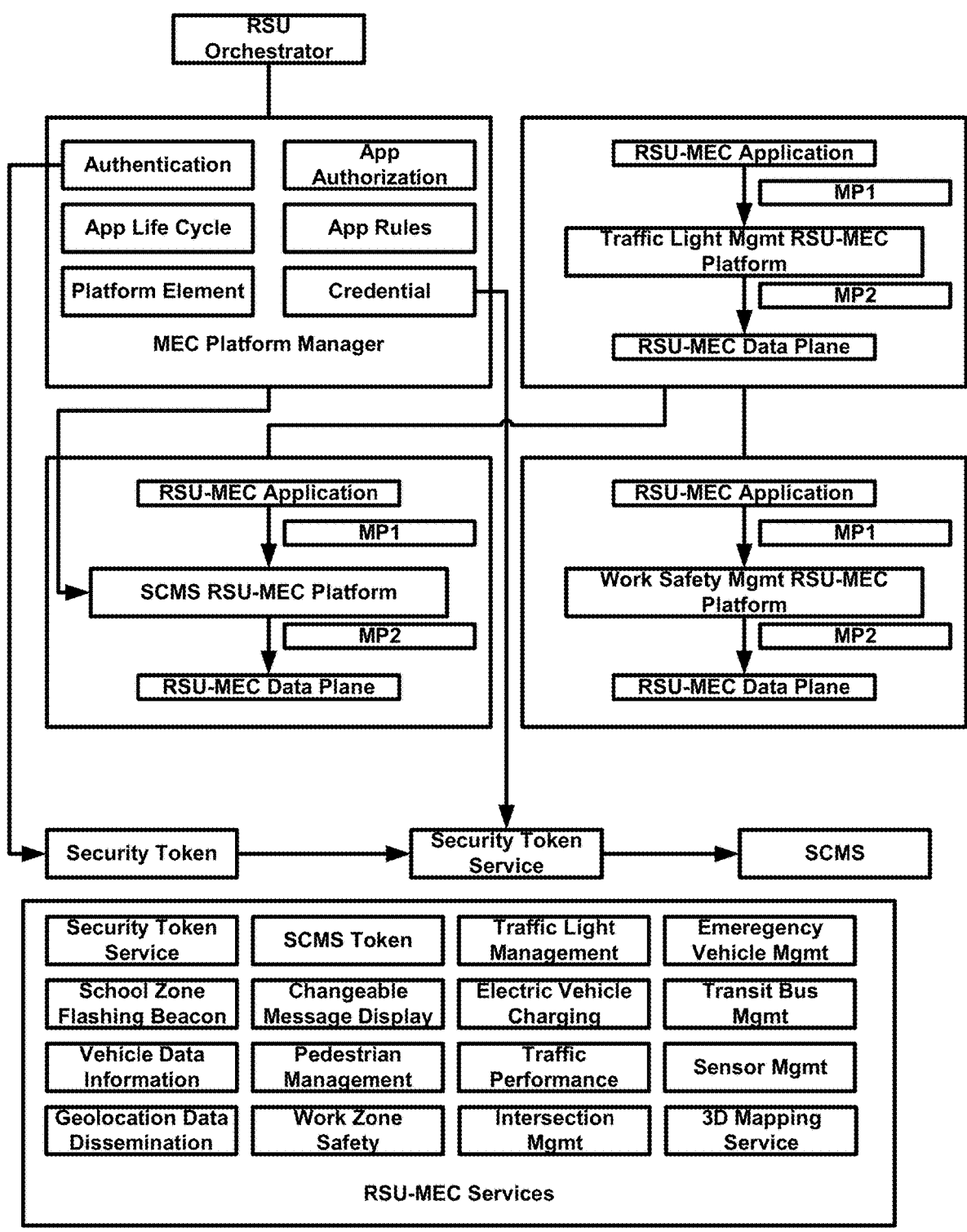
FIG. 6 illustrates an RSU-MEC architecture for the wireless traffic management system, in accordance with one or more embodiments set forth, shown, and/or described herein.

As illustrated in FIG. 6, in accordance with one or more embodiments, the RSU-MEC 110 platform may comprise a plurality of functional elements. The MEC host is an entity that contains the MEC platform and a virtualization infrastructure that provides compute, storage, and network resources for RSU-MEC supported application(s). The RSU-MEC 110 platform facilitates an environment in which MEC applications can discover, advertise, consume, and offer MEC services. The RSU-MEC 110 platform platform offers authorization, authentication, credential Management, and other resources. The RSU-MEC 110 platform is configured to manage the application life-cycle and rules, and receives traffic rules from the MEC platform manager, applications, or services, and configures the data plane accordingly. The RSU-MEC 110 platform is configured to receive domain name system (DNS) records from the MEC platform manager and configures a DNS proxy/server accordingly. The RSU-MEC 110 platform is configured to host MEC services and provides access to persistent storage and time of day information. MEC applications run as virtual machines (VM) on top of the virtualization infrastructure provided by the MEC host and can interact with the MEC platform to consume and provide MEC services.

OpenStack is an open-source virtualization platform which enables virtual network functions (VNFs) to be deployed using server hardware. OpenStack provides a manner in which to construct an NFV infrastructure that is compatible with ETSI management and orchestration (MANO) standards for NFV. This is because both ETSI and the Linux Foundation's Open Platform for NFV (OPNFV) have used OpenStack as its Virtualized Infrastructure Manager (VIM). This software can be used for the underlying virtualization platform. This platform can then use underlying 5G infrastructure and other communication infrastructure to comply with multi-access edge computing.

The Cloud-Virtualization Platform and the Choice of Virtual Machine Software (VMS)

In accordance with one or more embodiments, Multi-access Edge Computing enables the implementation of MEC applications as software-only entities that run on top of a virtualization infrastructure, which is located in or close to the network edge.

Figure 7:
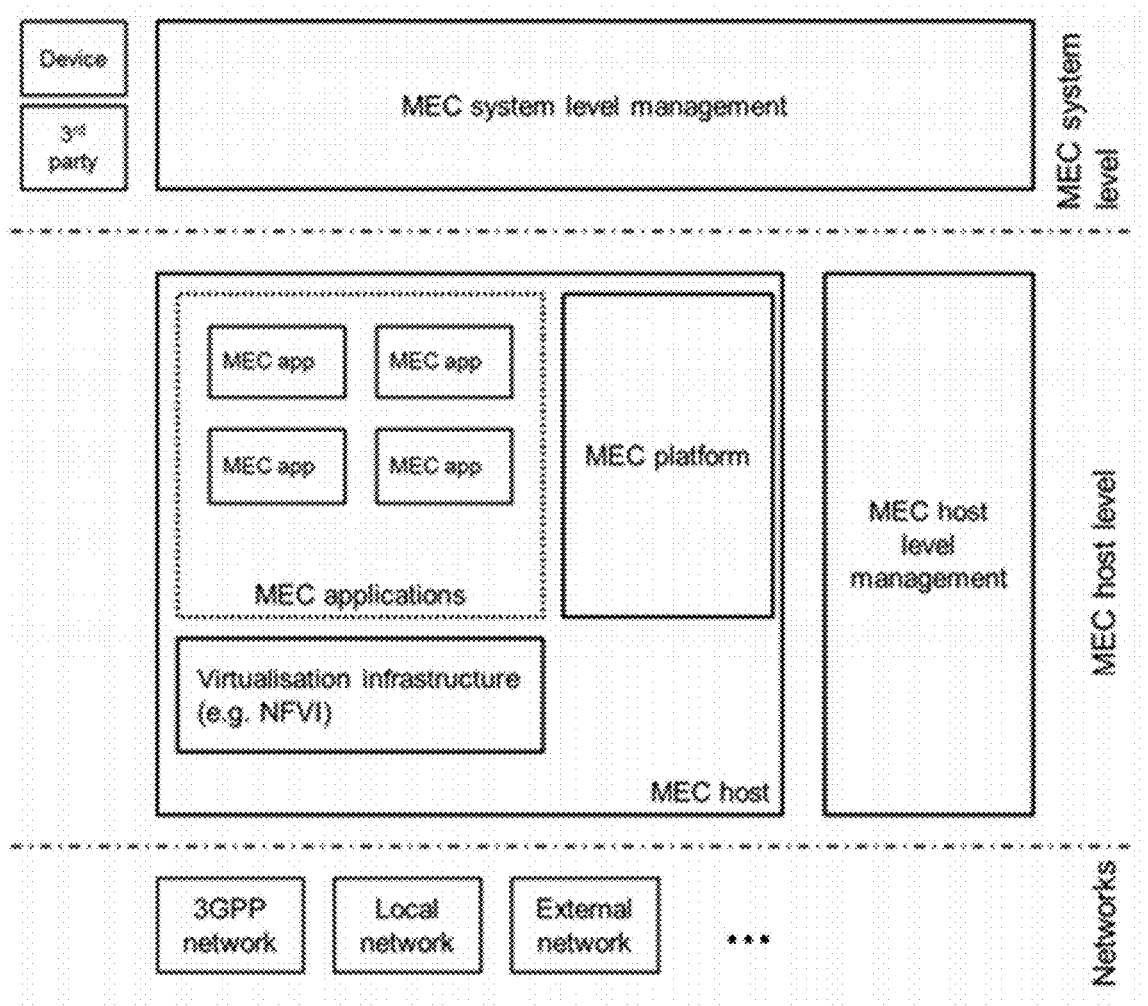
FIG. 7 illustrates an MEC framework for the wireless traffic management system, in accordance with one or more embodiments set forth, shown, and/or described herein.

The Multi-access Edge Computing framework shows the general entities involved. These can be grouped into system-level, host-level, and network-level entities, as illustrated in FIG. 7, which shows the framework for multi-access edge Computing, comprising the following components.

MEC host (MEC platform, MEC applications, and Virtualization infrastructure), MEC system-level management, MEC host-level management, and External related entities, i.e., network-level entities. Of these, the MEC host is the entity that contains the MEC platform and a virtualization infrastructure which provides compute, storage, and network resources for the MEC applications. The virtualization infrastructure includes a data plane that executes the traffic rules received by the MEC platform and routes the traffic among applications, services, DNS server/proxy, 3GPP network, other access networks, local networks, and external networks.

In accordance with one or more embodiments, the MEC platform is responsible for the following functions: (i) offering an environment where the MEC applications can discover, advertise, consume, and offer MEC services including, when supported, MEC services available via other platforms that may be in the same or different MEC systems; (ii) receiving traffic rules from the MEC platform manager, applications, or services, and instructing the data plane accordingly. When supported, this includes the translation of tokens representing UEs in the traffic rules into specific IP addresses; (iii) receiving DNS records from the MEC platform manager and configuring a DNS proxy/server accordingly; and (iv) hosting MEC services.

In accordance with one or more embodiments, MEC applications run as virtual machines (VM) on top of the virtualization infrastructure provided by the MEC host and can interact with the MEC platform to consume and provide MEC services.

In accordance with one or more embodiments, MEC applications can also interact with the MEC platform to perform specific support procedures related to the lifecycle of the application, such as indicating availability, preparing relocation of user state, etc. MEC applications can have a certain number of rules and requirements associated thereto, such as, for example, required resources, maximum latency, required or useful services, etc. These requirements are validated by the MEC system-level management and can be assigned to default values if missing.

In accordance with one or more embodiments, the ETSI MEC architectural framework introduces the virtualization infrastructure of the MEC host either as a generic or as a network functions virtualization (NFV) Infrastructure (NFVI). NFVI and virtualization are available in most of the hypervisor. It is also available as a separate open-source layer. RSU-MEC can be built on top of virtualization capabilities (virtual machine software) such as OpenStack.

The Authentication Framework

In accordance with one or more embodiments, the MEC platform can be configured to exchange data and information in a secure manner with other MEC platforms that may belong to different MEC systems. Currently, however, there is no security architecture defined for API calls between MECs serving the same application slice.

Figure 8:
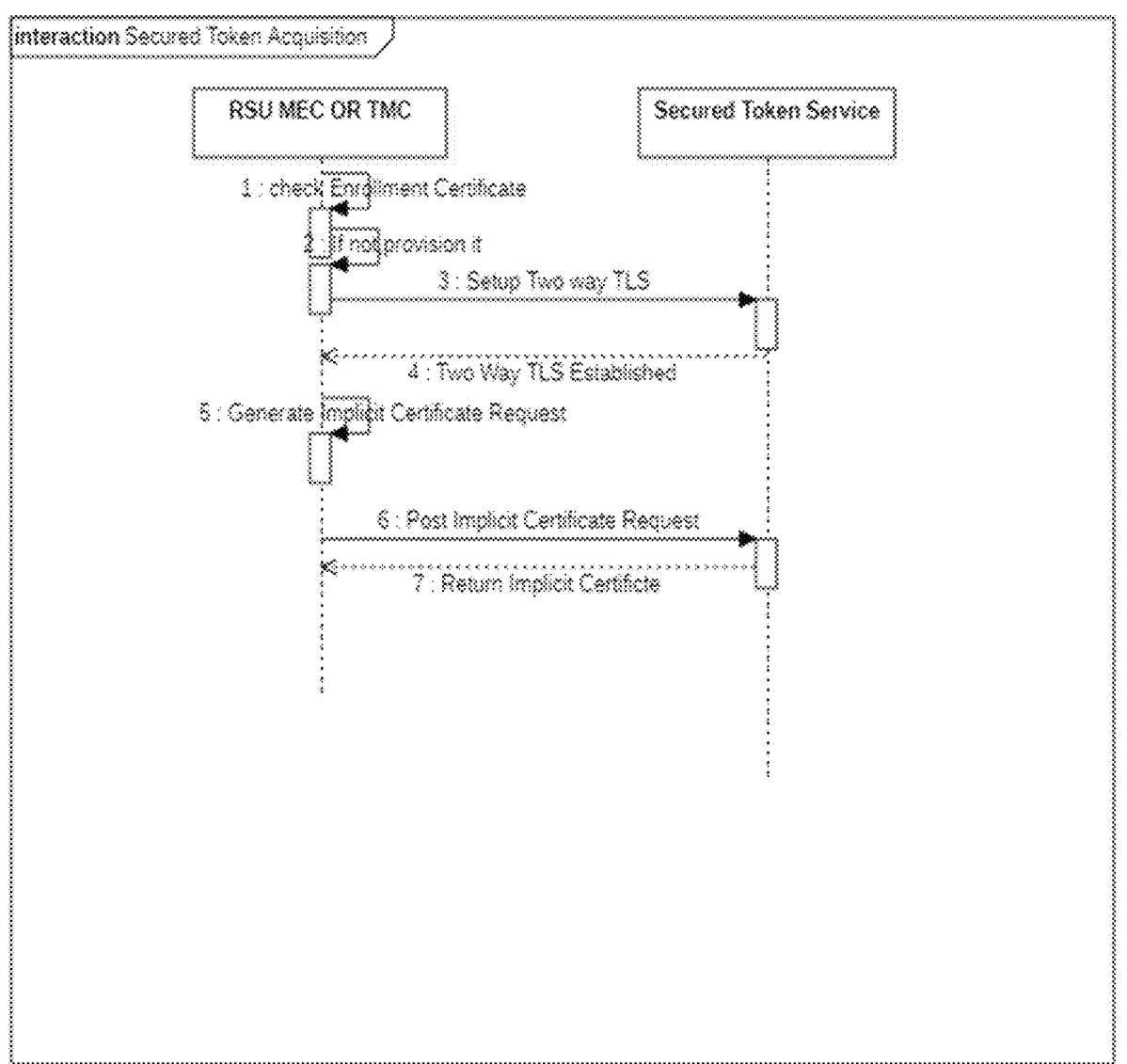
FIG. 8 illustrates security token acquisition for the wireless traffic management system, in accordance with one or more embodiments set forth, shown, and/or described herein.

In accordance with one or more embodiments, SCMS and a security token service is used to protect each API call. In this scheme, each host enrolls in SCMS and receives an enrollment certificate, which is an implicit certificate based on elliptic-curve cryptography. This certificate is used to establish a two-way transport layer security (TLS) scheme for a security token service. On a successful connection, the host provides the choices of preferred APIs. In accordance with an embodiment of the present disclosure, the security token service provides an implicit certificate that lists the APIs permitted for this certificate. This interaction is illustrated in FIG. 8. This implicit certificate is used to sign messages for API calls, in accordance with one or more embodiments.

Figure 9:
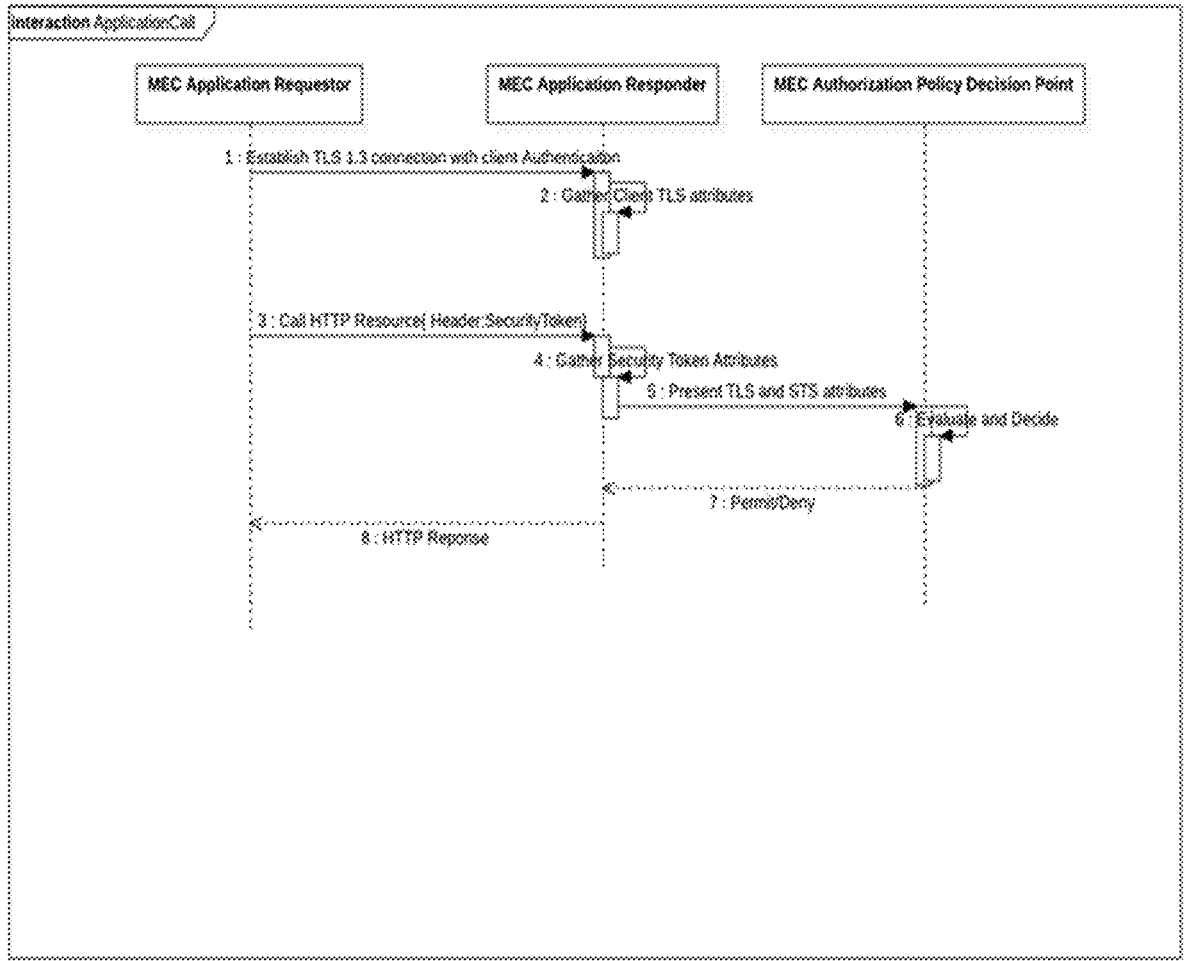
FIG. 9 illustrates an application call authorization scheme for the wireless traffic management system, in accordance with one or more embodiments set forth, shown, and/or described herein.

Since the implicit certificate already has a list of permitted APIs, it is used in an authorization scheme to evaluate the validity of the API call, as illustrated in FIG. 9. A description of each component of the scheme is provided in detail hereinbelow.

An MEC application shall authenticate itself to another application, hosted on a different host, using two security mechanisms: (i) TLS 1.3 client authentication; and (ii) a security token. TLS Client Authentication provides a mechanism for cryptographically authenticating the client. This authentication would be useful should a server want to restrict access to some services to only specific authorized clients. Accordingly, a client may use its private key to sign something, thus proving that it has possession of the private key corresponding to the certificate.

Figure 10:
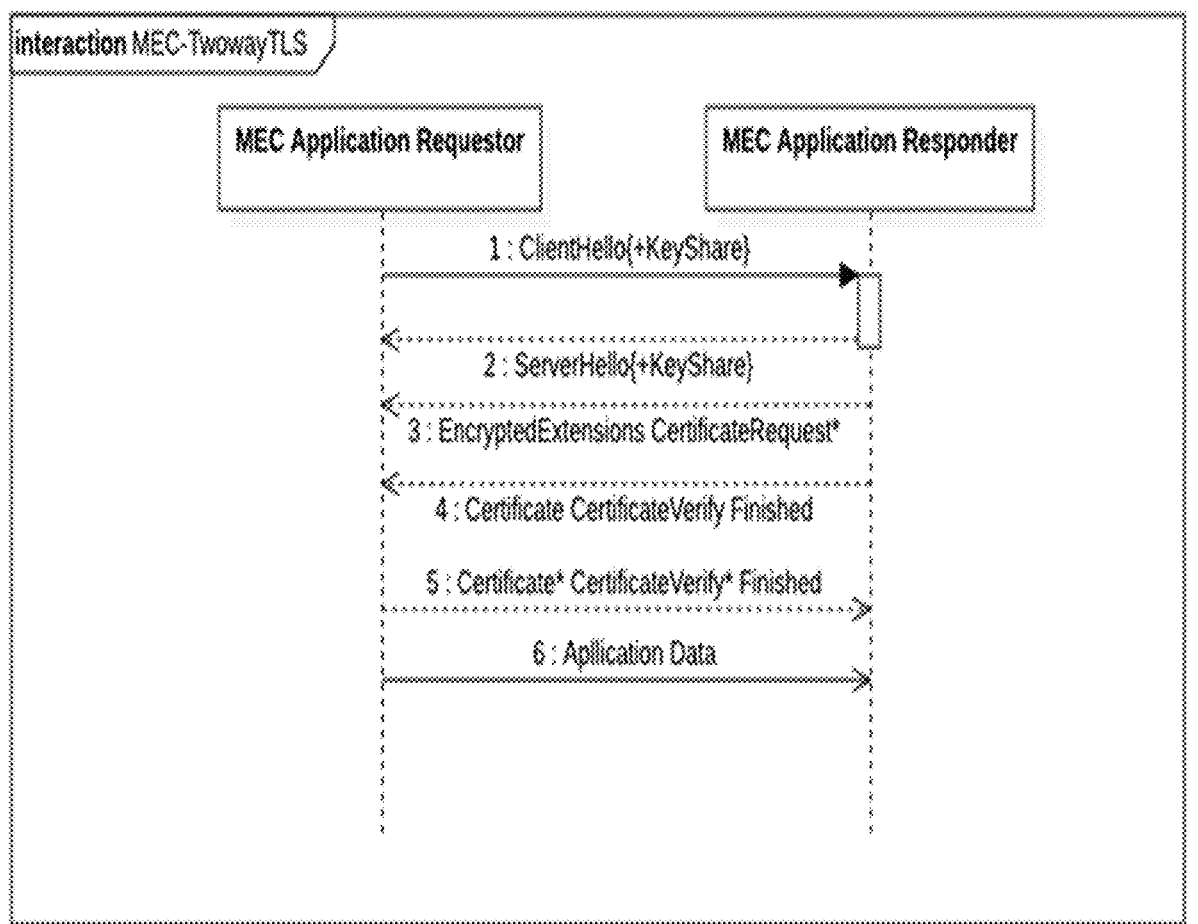
FIG. 10 illustrates an RSU-MEC Two-Way TLS using 1609.2 Certificate for the wireless traffic management system, in accordance with one or more embodiments set forth, shown, and/or described herein.

The TLS handshake in context of the RSU-MEC is illustrated in FIG. 10. Client authentication is initiated by the server sending a Certificate Verify message to the client. In an initial Elliptic-Curve Diffie-Hellman Ephemeral (ECDHE) handshake, as illustrated in FIG. 10, a client sends a ClientHello message containing a random nonce, i.e., a freshly generated random value, and a list of symmetric algorithms. The client also sends a set of Diffie-Hellman (DH) key shares and the associated groups, KeyShare, and potentially some other extensions. Upon receipt of the ClientHello message, the server selects appropriate cryptographic parameters for the connection and responds with a ServerHello message. This message contains a server-generated random nonce, an indication of the selected parameters, and potentially other extensions. The server also sends a KeyShare message, in addition to an EncryptedExtensions message, and optionally a CertificateRequest message. The KeyShare contains the server's choice of group and its ephemeral DH key share. The client and server key shares are used to compute handshake and application traffic keys. The EncryptedExtensions message contains material that is not necessary for determining cryptographic parameters. For instance, the draft specification lists the server name and the maximum TLS fragment length as possible values to be sent in this message.

A full TLS 1.3 handshake CertificateRequest message indicates that the server requests client authentication in the mutual authentication case. The server will also send a Certificate message, containing the server's certificate and a CertificateVerify message, which is a digital signature over the current transcript. These two messages allow the client to authenticate the server. The server also sends a Finished message. This message is a Message Authentication Code (MAC) covering the entire handshake, providing key confirmation and binding the server's identity to the computed traffic keys. The client responds with Certificate and CertificateVerify messages, if requested, and then sends its own Finished message.

The Security Token Service disseminates a security token at a predefined Representational State Transfer (REST) Universal Resource Locator (URL). The requester first established a two-way TLS connection to the security token service. It then sends a request for the desired REST URL(s) access. If the policy permits and the recipient's requirements are met, the requester then receives a security token response. This scheme is shown in FIG. 8. While building a security token, the security token service embeds the unique properties of the TLS certificate in it. This mechanism ensures that the security token may be used only with a particular TLS certificate. The security token is therefore an implicit certificate, with a plurality of additional custom attributes. These attributes are vital for authorization decisions. The request message is signed using this implicit certificate. Hence, there is a continuous authentication dependency among message, security token, and TLS certificate of the client.

The Authorization Framework

In accordance with one or more embodiments, an authorization policy can be described as a set of 4-tuples (s, r, a, c) stating that the subject "s" is allowed to perform the action "a" on resource "r" should the set of condition "c" is evaluated to true. The set of actions a subject is allowed to perform on a resource are called privileges. In the context of each RSU-MEC system 100, 200, 300, 400, 500, "s" represents the requester application, "r" is a REST URL, "a" is the HTTP method, and "c" indicates permit or deny permissions. In accordance with an embodiment of the present disclosure, an eXtensible Access Control Markup Language (XACML) architecture and data flow is used. This architecture includes four key components: the PEP (Policy Enforcement Point), the PDP (Policy Decision Point), the PAP (Policy Administration Point), and the PIP (Policy Information Point). The PEP enforces access control by making decision requests and enforcing authorization decisions.

The PDP evaluates the applicable policy and renders an authorization decision. The PAP creates security policies and stores them in an appropriate repository.

Figure 11:
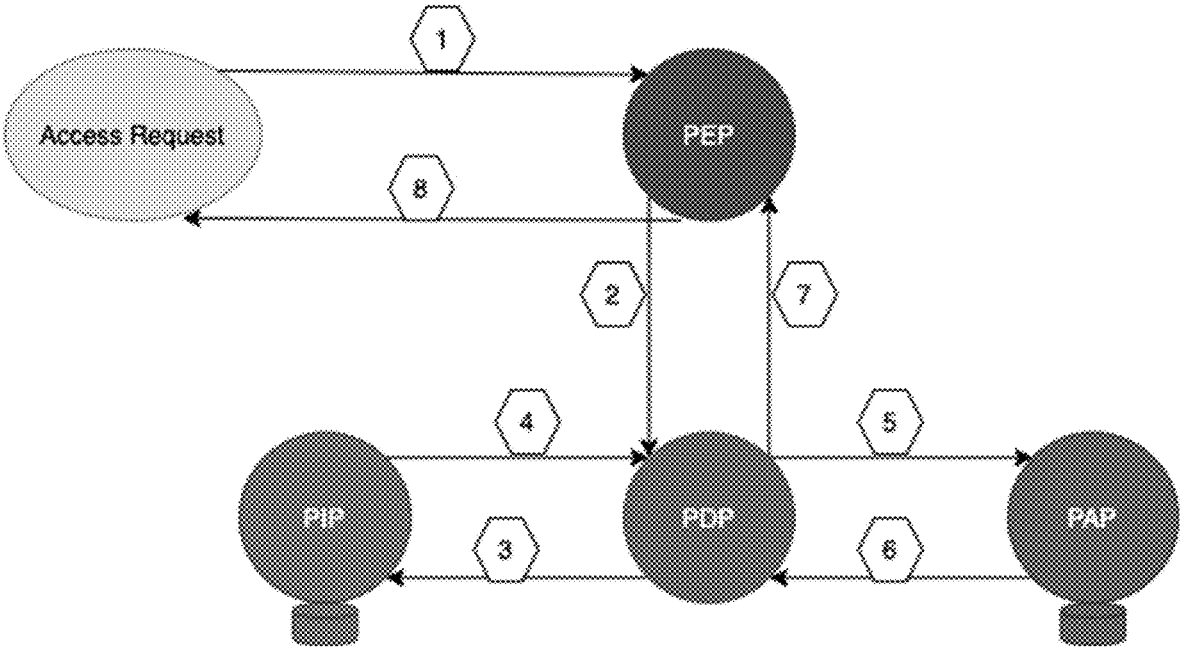
FIG. 11 illustrates an XACML Authorization Work Flow for the wireless traffic management system, in accordance with one or more embodiments set forth, shown, and/or described herein.

The PIP serves as the source of attributes or data required for policy evaluation. It manages all the information related to the subject, resource, and environment. A simplified version of this model is illustrated in FIG. 11. The typical workflow includes the following process blocks.

Initially, the access requester sends an access request to the PEP. It may include attribute values of the subjects, resources, and environment. Then, the PEP constructs a standard XACML request Context and sends it to the PDP. The PDP then issues a request for any additional subject, resource, and environment attribute values from the PIP. The PIP then obtains the requested attributes and returns them to the PDP. The PDP then makes a request to the PAP for the policies according to the target of the request. The PAP then returns the requested policies. The PDP then evaluates the related policy and returns the standard XACML Response Context to the PEP. Lastly, the the PEP then enforces the authorization decision A complete combined Authentication and Authorization flow is illustrated in FIG. 9, in accordance with one or more embodiments. In this flow, during the establishment of TLS with client authentication, attributes listed in the certificates are read. The Request Header in the HTTP resource call contains the security token. The TLS and secure token service (STS) attributes inscribed in the security token are read. These two sets of attributes are presented to the PDP, and based on the decision made a proper HTTP response is returned. This HTTP response can be either an HTTP 403 message or an HTTP 200 message with the response body.

The Credential Management Framework

Figure 12:
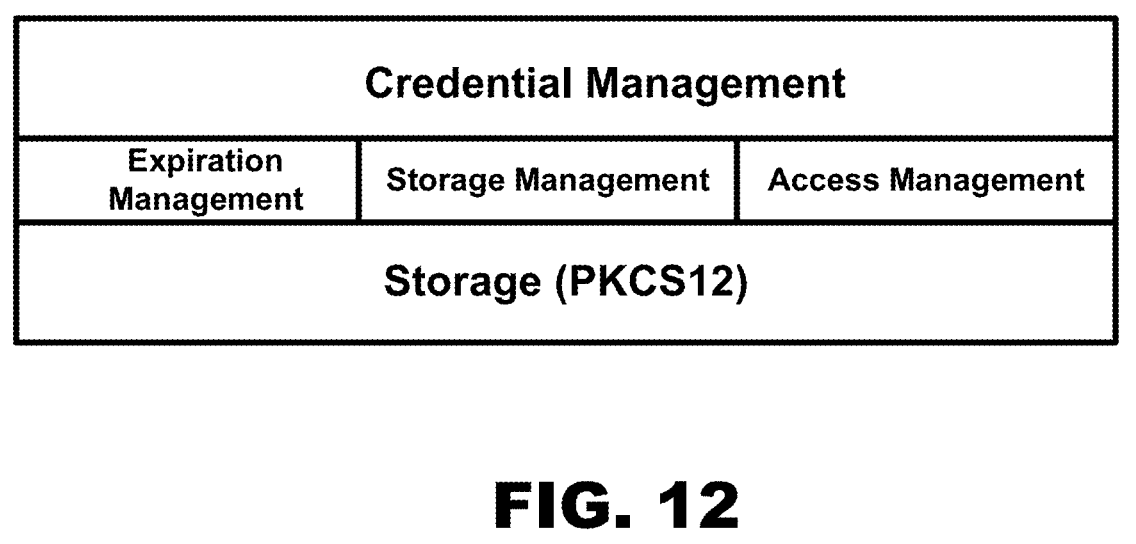

As illustrated in FIG. 12, credential management comprises a software stack that itself comprises a plurality of software components, such as, for example, Expiration Management, Storage Management, and Access Management.

For Expiration Management software, generally, certificates are valid for a limited period of time. This layer of software is aware of expiration dates and request a new certificate when required. For Storage Management software, an encrypted file system will store all certificates. Individual private keys and certificates will be stored in a specialized scheme, such as, for example, Public Key Cryptography Standards 12 (PKCS12). For Access Management software, accessing PKCS12 files will require credentials. There may be a need to differentiate which process can access which PKCS12 file.

Inter RSU-MEC Communication

All RSU-MECs must possess IEEE 1609.2 explicit certificates in order to facilitate communication between RSU-MECs. Using IEEE 1609.2 explicit certificates, a pair of RSU-MECs can establish a two-way TLS connection, as described herein. The described mechanism allows an RSU-MEC to obtain a security token from the security token service available in that edge computing realm, and then use the security token to make API calls, by making REST calls within the prescribed HTTP method with a Security Token in the HTTP Header. The responder evaluates using the authorization layer as described herein.

Figure 13:
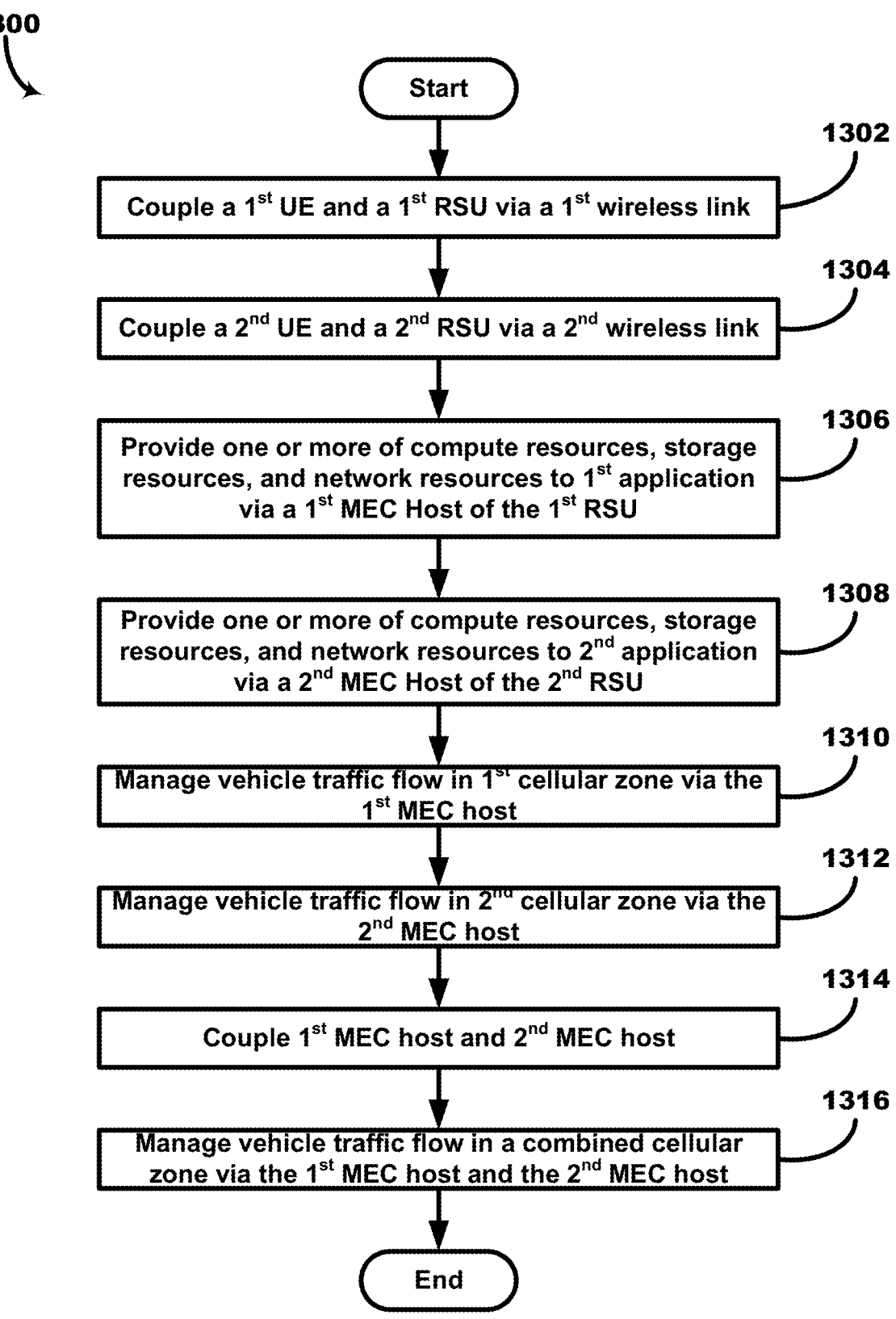
FIG. 13 illustrates a flow chart of a computer-implemented method for traffic management, in accordance with one or more embodiments set forth, shown, and/or described herein.

The illustrated examples shown in FIGS. 13 and 14 sets forth computer-implemented methods 1300, 1400 of managing traffic, in accordance with one or more embodiments. In accordance with one or more embodiments, the methods 1300, 1400 may be implemented, for example, in logic instructions (e.g., software), configurable logic, fixed-functionality hardware logic, etc., or any combination thereof executed by one or more processors of a computing device.

As illustrated in FIG. 13, illustrated process block 1302 includes coupling, via a first wireless link, a first UE and a first RSU.

The computer-implemented method 1300 may then proceed to illustrated process block 1304, which includes coupling, via a second wireless link, a second UE and a second RSU.

The computer-implemented method 1300 may then proceed to illustrated process block 1306, which includes providing, via a first MEC host of the first RSU, one or more of compute resources, storage resources, and network resources to a first application for execution by the first MEC host.

The computer-implemented method 1300 may then proceed to illustrated process block 1308, which includes providing, via a second MEC host of the second RSU, one or more of compute resources, storage resources, and network resources to a second application for execution by the second MEC host.

The computer-implemented method 1300 may then proceed to illustrated process block 1310, which includes managing, via the first MEC host, vehicle traffic flow in a first cellular zone or region.

The computer-implemented method 1300 may then proceed to illustrated process block 1312, which includes managing, via the second MEC host, vehicle traffic flow in a second cellular zone or region.

The computer-implemented method 1300 may then proceed to illustrated process block 1314, which includes coupling, via an API, the first MEC host and the second MEC host.

The computer-implemented method 1300 may then proceed to illustrated process block 1316, which includes managing, by execution of the first application by the first MEC host and the second application by the second MEC host, vehicle traffic flow in a combined and/or overlapping cellular zone or region. The method 1300 may terminate or end upon execution of process block 1316.

As illustrated in FIG. 14, illustrated process block 1402 includes coupling, via a first wireless link, a first UE and a first RSU, and coupling, via a second wireless link, a second UE and a second RSU.

The computer-implemented method 1400 may then proceed to illustrated process block 1404, which includes concurrently providing, via a first MEC host of the first RSU, one or more of compute resources, storage resources, and network resources to a first application for execution by the first MEC host, and concurrently providing a second MEC host of the second RSU, one or more of compute resources, storage resources, and network resources to a second application for execution by the second MEC host.

The computer-implemented method 1400 may then proceed to illustrated process block 1406, which includes managing, via the first MEC host, vehicle traffic flow in a first cellular zone or region, and concurrently managing, via the second MEC host, vehicle traffic flow in a second cellular zone or region.

The computer-implemented method 1400 may then proceed to illustrated process block 1408, which includes managing, by execution of the first application by the first MEC host and the second application by the second MEC host, vehicle traffic flow in a combined and/or overlapping cellular zone or region. The method 1400 may terminate or end upon execution of process block 1408.

The terms "coupled," "attached," or "connected" may be used herein to refer to any type of relationship, direct or indirect, between the components in question, and may apply to electrical, mechanical, fluid, optical, electromagnetic, electromechanical or other connections. Additionally, the terms "first," "second," etc. are used herein only to facilitate discussion, and carry no particular temporal or chronological significance unless otherwise indicated. The terms "cause" or "causing" means to make, force, compel, direct, command, instruct, and/or enable an event or action to occur or at least be in a state where such event or action may occur, either in a direct or indirect manner.

Those skilled in the art will appreciate from the foregoing description that the broad techniques of the exemplary embodiments may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B, or C" means "any of the following: A; B; C; A and B; A and C; B and C; A, B, and C." An exception to this definition will occur only when a combination of elements, functions, steps, or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth. References to items in the singular should be understood to include items in the plural, and vice versa, unless explicitly stated otherwise or clear from the text.

The use of any and all examples or exemplary language ("e.g.," "such as," "for example," or the like) provided herein, is intended merely to better illuminate the embodiments and does not pose a limitation on the scope of the embodiments. No language in the specification should be construed as indicating any unclaimed element as essential to the practice of the embodiments.

What is claimed is:

1. A traffic management system, comprising:

a first roadside unit (RSU), the first RSU configured to couple to a first mobile user element (UE) via a first wireless link, where the first wireless link includes a plurality of first safety messages from the first mobile UE to the first RSU, the plurality of first safety messages having traffic lane information of a plurality of first traffic lanes in a first cellular zone provided to the first RSU by one or more road sensors coupled to the first RSU;

a second RSU, the second RSU configured to couple to a second mobile UE via a second wireless link, where the second wireless link includes a plurality of second safety messages from the second mobile UE to the second RSU, the plurality of second safety messages having traffic lane information of a plurality of second traffic lanes in a second cellular zone provided to the second RSU by the one or more sensors coupled to the second RSU;

a first multi-access edge computing (MEC) host of the first RSU at an edge of a network and having a virtualization infrastructure and a MEC platform, virtualization infrastructure of the first MEC host configured to provide one or more of compute resources, storage resources, and network resources to at least a first application configured to run on the virtualization infrastructure provided by the first MEC host and the MEC platform of the first MEC host configured to manage operation of the at least first application to manage vehicle traffic flow in the first cellular zone, the first RSU operable to perform in accordance with the traffic lane information of the plurality of first traffic lanes in the first cellular zone one or more of estimation of a number of vehicles queued in the plurality of first traffic lanes and estimation of signal phase timing of traffic light signals by an intersection management system (IMS) of the first cellular zone; and a second MEC host of the second RSU at an edge of the network and having a virtualization infrastructure and a MEC platform, the virtualization infrastructure of the second MEC host configured to provide one or more of compute resources, storage resources, and network resources to at least a second application configured to run on the virtualization infrastructure provided by the second MEC host and the MEC platform of the second MEC host configured to manage operation of the at least second application to manage vehicle traffic flow in the second cellular zone, the second RSU operable to perform in accordance with the traffic lane information of the plurality of second traffic lanes in the second cellular zone one or more of estimation of a number of vehicles queued in the plurality of second traffic lanes and estimation of signal phase timing of traffic light signals by an intersection management system (IMS) of the second cellular zone.

2. The traffic management system of claim 1, wherein at least one API call between the first application and the second application is authenticated by one or more of a MEC platform of the first MEC host and a MEC platform of the second MEC host based, at least in part, on a Security Credential Management System (SCMS) enrollment certificate.

3. The traffic management system of claim 1, wherein one or more of the first wireless link and the second wireless link includes a cellular-vehicle-to-everything (CV2X) link.

4. The traffic management system of claim 1, wherein:
one or more of the first mobile UE and the second mobile UE is configured to report traffic events to the first MEC host and the second MEC host, respectively,
the first MEC host is configured to respond to the report from the first mobile UE in accordance with a received policy, and
the second MEC host is configured to respond to the report from the second mobile UE in accordance with a received policy.

5. The traffic management system of claim 1, further comprising:
the one or more road sensors including one or more sensor UEs operably coupled to the first RSU and the second RSU via at least a third wireless link; and
a changeable message display UE operably coupled to the RSU via at least the third wireless link.

6. The traffic management system of claim 5, wherein the at least a third wireless link includes a cellular-vehicle-to-everything (CV2X) link.

7. The traffic management system of claim 1, wherein:
managing vehicle traffic flow in the first cellular zone includes managing one or more traffic intersections in the first cellular zone and one or more traffic lanes of the plurality of first traffic lanes using the traffic lane information of the plurality of first traffic lanes, and
managing vehicle traffic flow in the second cellular zone includes managing one or more traffic intersections in the second cellular zone and one or more traffic lanes of the plurality of second traffic lanes using the traffic lane information of the plurality of second traffic lanes.

8. The traffic management system of claim 1, wherein:
managing vehicle traffic flow in the first cellular zone includes managing vehicle traffic flow at one or more traffic intersections in the first cellular zone independently of a corresponding one or more traffic signals at the one or more traffic intersections in the first cellular zone, and
managing vehicle traffic flow in the second cellular zone includes managing vehicle traffic flow at one or more traffic intersections in the second cellular zone independently of a corresponding one or more traffic signals at the one or more traffic intersections in the second cellular zone.

9. The traffic management system of claim 1, wherein:
one or more of the first mobile UE and the second mobile UE is operably coupled to an emergency vehicle and configured to transmit a destination to at least one of the first MEC host and the second MEC host, and
in response to receipt of the destination, at least one of the first MEC host and the second MEC host is configured to reply with a path to the destination, and then reserve a traffic lane on at least a portion of the path for use by the emergency vehicle.

10. The traffic management system of claim 1, the second application being coupled to the first application via an application programming interface (API) in a manner that facilitates management of vehicle traffic flow in a combined cellular zone by the first application and the second application.

11. The traffic management system of claim 1, where the first and second RSUs are fifth generation cellular (5G) RSUs.

12. The traffic management system of claim 1, further comprising the MEC platform of the first MEC host configured to receive traffic rules, configure a first data plane of the virtualization infrastructure of the first MEC host in accordance with the received traffic rules, and to manage the at least first application to execute the received traffic rules to route traffic in the first cellular zone and further comprising the MEC platform of the second MEC host configured to receive traffic rules, configure a second data plane of the virtualization infrastructure of the second MEC host in accordance with the received traffic rules, and to manage the at least second application to execute the received traffic rules to route traffic in the second cellular zone.

13. The traffic management system of claim 1, where the plurality of first safety messages and the plurality of second safety messages include messages in a Basic Safety Message (BSM) format with the traffic lane information of the plurality of first traffic lanes and the plurality of second traffic lanes, respectively.

14. A computer-implemented method for traffic management, comprising:
coupling, via a first wireless link, a first UE and a first RSU, and coupling, via a second wireless link, a second UE and a second RSU, where the first wireless link including a plurality of first safety messages from the first UE to the first RSU, the plurality of first safety messages having traffic lane information of a plurality of first traffic lanes in a first cellular zone or region provided to the first RSU by one or more road sensors coupled to the first RSU and the second wireless link including a plurality of second safety messages from the second UE to the second RSU, the plurality of second safety messages having traffic lane information of a plurality of second traffic lanes in a second cellular zone or region provided to the first RSU by the one or more road sensors coupled to the first RSU;
via a first MEC host of the first RSU at an edge of a network, the first MEC host having a virtualization infrastructure and a MEC platform, the virtualization infrastructure of the first MEC host providing one or more of compute resources, storage resources, and network resources to a first application configured to run on the virtualization infrastructure provided by the first MEC host, and concurrently, via a second MEC host of the second RSU at an edge of a network, the second MEC host having a virtualization infrastructure and a MEC platform, the virtualization infrastructure of the second MEC host providing one or more of compute resources, storage resources, and network resources to a second application configured to run on the virtualization infrastructure provided by the second MEC host; and managing, via the MEC platform of the first MEC host, vehicle traffic flow in the first cellular zone or region in accordance with the traffic lane information of the plurality of first traffic lanes in the first cellular zone or region, said managing including one or more of estimating a number of vehicles queued in the plurality of first traffic lanes and estimating signal phase timing of traffic light signals by an intersection management system (IMS) of the first cellular zone or region, and concurrently managing, via the MEC platform of the second MEC host, vehicle traffic flow in the second cellular zone or region in accordance with the traffic lane information of the plurality of second traffic lanes in the second cellular zone or region, said managing including one or more of estimating a number of vehicles queued in the plurality of second traffic lanes and estimating signal phase timing of traffic light signals by an intersection management system (IMS) of the second cellular zone or region.

15. The computer-implemented method of claim 14, where the plurality of first safety messages and the plurality of second safety messages include messages in a Basic Safety Message (BSM) format with the traffic lane information of the plurality of first traffic lanes and the plurality of second traffic lanes, respectively.

16. The computer-implemented method of claim 14, further comprising authenticating at least one API call between the first MEC host and the second MEC host based, at least in part, on a SCMS enrollment certificate.

17. The computer-implemented method of claim 14, wherein at least one of the first wireless link and the second wireless link includes a CV2X link.

18. The computer-implemented method of claim 14, further comprising:

reporting traffic events to the MEC host by at least one of the first mobile UE and the second mobile UE; and responding, by the first MEC host, to the report from the first mobile UE in accordance with a received policy, and responding, by the second MEC host, to the report from the second mobile UE in accordance with a received policy.

19. The computer-implemented method of claim 14, wherein:

managing vehicle traffic flow in the first cellular zone includes managing one or more traffic intersections in the first cellular zone and one or more traffic lanes of the plurality of first traffic lanes using the traffic lane information of the plurality of first traffic lanes, and managing vehicle traffic flow in the second cellular zone includes managing one or more traffic intersections in the second cellular zone and one or more traffic lanes of the plurality of second traffic lanes using the traffic lane information of the plurality of second traffic lanes.

20. The computer-implemented method of claim 14, wherein:

managing vehicle traffic flow in the first cellular zone includes managing vehicle traffic flow at one or more traffic intersections in the first cellular zone independently of a corresponding one or more traffic signals at the one or more traffic intersections in the first cellular zone, and managing vehicle traffic flow in the second cellular zone includes managing vehicle traffic flow at one or more traffic intersections in the second cellular zone independently of a corresponding one or more traffic signals at the one or more traffic intersections in the second cellular zone.

21. The computer-implemented method of claim 14, further comprising:

managing, by execution of the first application by the first MEC host and the second application by the second MEC host, vehicle traffic flow in a combined and/or overlapping cellular zone, wherein, via an API, the first MEC host and the second MEC host are coupled via the API.

22. The computer-implemented method of claim 14, further comprising the MEC platform of the first MEC host:

configuring a first data plane of the virtualization infrastructure of the first MEC host in accordance with received traffic rules;

configuring a second data plane of the virtualization infrastructure of the second MEC host in accordance with received traffic rules; and managing the at least first application to execute the received traffic rules to route traffic in the first cellular zone and the at least second application to execute the received traffic rules to route traffic in the second cellular zone.

23. A traffic management system, comprising:

a RSU, configured to couple to a mobile UE via a gNode B (gNB) logical radio node and at least a first wireless link where the at least first wireless link includes a plurality of first safety messages from the mobile UE to the RSU, the plurality of first safety messages having traffic lane information of a plurality of traffic lanes provided to the RSU by one or more road sensors coupled to the RSU; and an MEC host of the RSU, at an edge of a network and having a virtualization infrastructure and a MEC platform, the virtualization infrastructure of the first MEC host configured to provide at least one of compute, storage, and network resources for an application configured to run on the virtualization infrastructure provided by the MEC host and the MEC platform of the MEC host configured to manage operation of the application to manage vehicle traffic flow in an intersection independent of a traffic signal, the RSU operable to perform in accordance with the traffic lane information of the plurality of traffic lanes one or more of estimation of a number of vehicles queued in the plurality of traffic lanes and estimation of signal phase timing of traffic light signals of the traffic signal.

24. The traffic management system of claim 23, further comprising one or more of a mobile UE, a sensor UE, and a changeable message display UE operably coupled to the RSU via at least a second wireless link, the sensor UE is the one or more road sensors coupled to the RSU and operable to provide the traffic lane information of the plurality of traffic lanes to the RSU.

25. The traffic management system of claim 23, wherein:

the mobile UE is operably coupled to an emergency vehicle and configured to transmit a destination to the MEC host; and the MEC host, upon receipt of the destination, is configured to transmit a reply to the mobile UE with a path to the destination, and reserve a traffic lane on at least a portion of the path for use by the emergency vehicle.

\* \* \* \* \*